(12) United States Patent
Kato et al.

(10) Patent No.: US 8,909,452 B2
(45) Date of Patent: Dec. 9, 2014

(54) VEHICLE DRIVING SUPPORT APPARATUS

(75) Inventors: Hiroki Kato, Tokyo (JP); Kiyoshi Natori, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 111 days.

(21) Appl. No.: 13/411,434

(22) Filed: Mar. 2, 2012

(65) Prior Publication Data

US 2012/0239265 A1  Sep. 20, 2012

(30) Foreign Application Priority Data

Mar. 15, 2011  (JP) ................................ 2011-056802

(51) Int. Cl.
| | | |
|---|---|---|
| *B60T 7/12* | (2006.01) | |
| *B60T 8/32* | (2006.01) | |
| *B60T 7/22* | (2006.01) | |
| *B60W 50/10* | (2012.01) | |
| *B60W 10/188* | (2012.01) | |
| *B60W 30/09* | (2012.01) | |
| *B60W 30/095* | (2012.01) | |
| *B60W 50/08* | (2012.01) | |
| *B60T 7/06* | (2006.01) | |

(52) U.S. Cl.
CPC .............. *B60T 7/22* (2013.01); *B60W 2540/12* (2013.01); *B60W 2420/42* (2013.01); *B60T 7/06* (2013.01); *B60W 50/10* (2013.01); *B60W 10/188* (2013.01); *B60W 30/09* (2013.01); *B60W 30/0953* (2013.01); *B60W 50/087* (2013.01); *B60T 2201/02* (2013.01)
USPC .................. 701/96; 701/70; 701/93

(58) Field of Classification Search
USPC ........................ 701/70–98; 303/193, 191, 125
See application file for complete search history.

(56) References Cited

U.S. PATENT DOCUMENTS

| | | | | |
|---|---|---|---|---|
| 5,332,057 | A | * | 7/1994 | Butsuen et al. ................. 701/70 |
| 5,835,008 | A | * | 11/1998 | Colemere, Jr. ................. 701/70 |
| 6,017,102 | A | * | 1/2000 | Aga ............... 303/191 |
| 6,415,230 | B1 | * | 7/2002 | Maruko et al. ................ 701/301 |
| 6,473,681 | B1 | * | 10/2002 | Eckert et al. ................... 701/96 |
| 6,517,172 | B1 | * | 2/2003 | Bond et al. ..................... 303/193 |
| 7,259,661 | B2 | * | 8/2007 | Kitterer et al. ............... 701/301 |
| 7,292,940 | B2 | * | 11/2007 | Isogai et al. .................... 701/96 |
| 7,395,144 | B2 | * | 7/2008 | Isaji et al. ........................ 701/93 |
| 7,668,633 | B2 | * | 2/2010 | Diebold et al. ................. 701/78 |
| 7,720,585 | B2 | * | 5/2010 | Fukuda et al. .................. 701/70 |
| 7,828,104 | B2 | * | 11/2010 | Akaba et al. .................... 701/70 |
| 7,866,427 | B2 | * | 1/2011 | Zagorski ......................... 701/96 |
| 8,392,085 | B2 | * | 3/2013 | Schonlau et al. ............... 701/78 |
| 2004/0167702 | A1 | | 8/2004 | Isogai et al. |
| 2007/0106475 | A1 | * | 5/2007 | Kondoh ......................... 701/301 |
| 2008/0162009 | A1 | * | 7/2008 | Miki et al. ...................... 701/80 |

FOREIGN PATENT DOCUMENTS

JP  2004-255928 A  9/2004

* cited by examiner

*Primary Examiner* — Helal A Algahaim
*Assistant Examiner* — Dale W Hilgendorf
(74) *Attorney, Agent, or Firm* — McGinn IP Law Group, PLLC

(57) ABSTRACT

In a vehicle driving support apparatus, if a brake pedal operation by a driver is detected during a braking control, a cruise control unit determines that it is highly likely that the driver recognizes a possibility of a collision of a subject vehicle and a obstacle, and halts the braking control. On the other hand, if a depression amount of the brake pedal by the driver changes to a release side at or over a preset speed, the cruise control unit restarts the halted braking control.

17 Claims, 3 Drawing Sheets

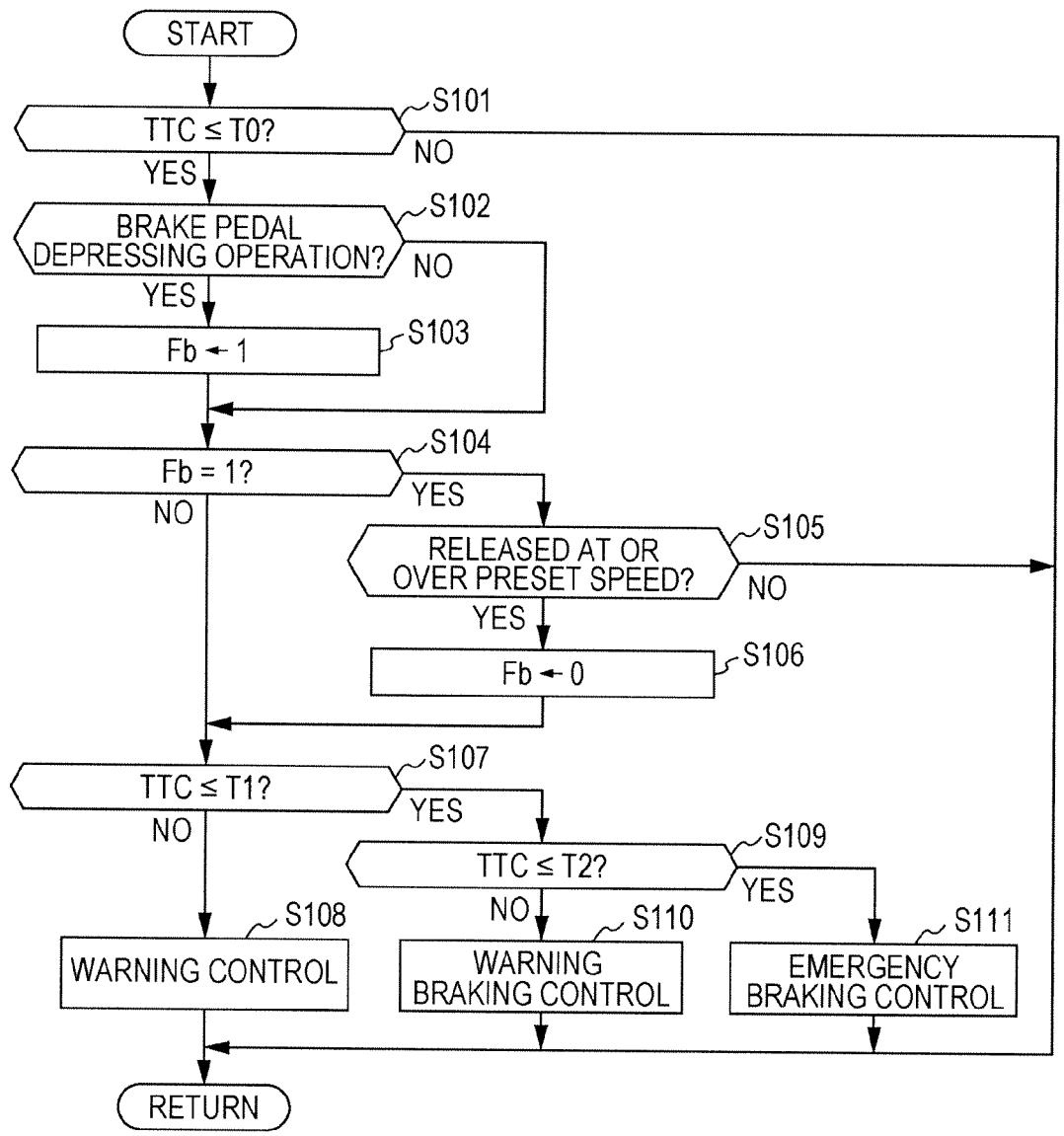

VEHICLE DRIVING SUPPORT APPARATUS

CROSS REFERENCES TO RELATED APPLICATIONS

The present application claims priority from Japanese Patent Application No. 2011-056802 filed on Mar. 15, 2011, the entire contents of which are hereby incorporated by reference.

BACKGROUND OF THE INVENTION

1. Field of the Invention

The present invention relates to vehicle driving support apparatuses for preventing a collision by performing an automatic braking intervention when there is a high possibility that a subject vehicle can collide with a obstacle such as a preceding vehicle.

2. Description of the Related Art

In recent years, there have been various proposals for a vehicle driving support apparatus configured to recognize out-of-vehicle information in front of a vehicle by using a millimeter wave radar, an infrared laser radar, a stereo camera, a monocular camera, or the like, and to execute a cruise control for the vehicle based on the recognized out-of-vehicle information. As an example of such cruise control function, there is widely known a follow-up cruise control to follow a preceding vehicle when such a vehicle is detected (captured) in front of a subject vehicle. The follow up cruise control has widely been in practical use as part of an adaptive cruise control (ACC). In a typical use of the ACC, the follow-up cruise control is executed when a preceding vehicle is detected in front of the subject vehicle, and a constant speed cruise control at a preset speed determined by the driver is executed if no preceding vehicle is detected.

In addition, as a cruise control function of the vehicle driving support apparatus, there have been various proposals for and a collision prevention control (so called a pre-crash braking control) that outputs a warning that prompts a brake operation and performs an automatic braking intervention independently from a brake operation by a driver when there is a high possibility that a subject vehicle can collide with a obstacle such as a preceding vehicle.

Furthermore, for a vehicle driving support apparatus of this kind, various technologies that cancel the automatic braking intervention when, for example, a brake pedal is operated by a driver have been proposed so as to give priority to the intention of the driver (see, for example, Japanese Unexamined Patent Application Publication (JP-A) No. 2004-255928).

Under the condition where there is a high possibility of a collision against a preceding vehicle or the like, the driver usually depresses the brake pedal. Thus, in the technology disclosed in JP-A No. 2004-255928, the automatic braking intervention is cancelled in most cases.

Accordingly, the technology disclosed in JP-A No. 2004-255928 may have difficulty effectively avoiding a collision if, for example, the driver's foot accidentally slips off the brake pedal after automatic braking is cancelled in response to the depression of the brake pedal during collision prevention control.

SUMMARY OF THE INVENTION

The present invention is made in view of the above, and it is an object of the present invention to provide a vehicle driving support apparatus that effectively performs a collision prevention control, while giving priority to an intention of the driver.

An aspect of the present invention provides a vehicle driving support apparatus including: a collision determining unit for determining a possibility of a collision of a subject vehicle and a obstacle that is recognized in front of the subject vehicle; a braking control unit for performing a braking control with respect to the obstacle when the collision determining units determines that there is a possibility of a collision of the subject vehicle and the obstacle; a control halt determining unit that determines a halt of the braking control when a brake pedal operation by a driver is detected; and a control restart determining unit that determines a restart of the halted braking control when a depression amount of the brake pedal changes to a release side at or over a preset speed while it is determined there is a possibility of a collision against the obstacle.

BRIEF DESCRIPTION OF THE DRAWINGS

FIG. 3 is a flowchart of a collision prevention control routine.

DESCRIPTION OF THE PREFERRED EMBODIMENTS

Figure 1:
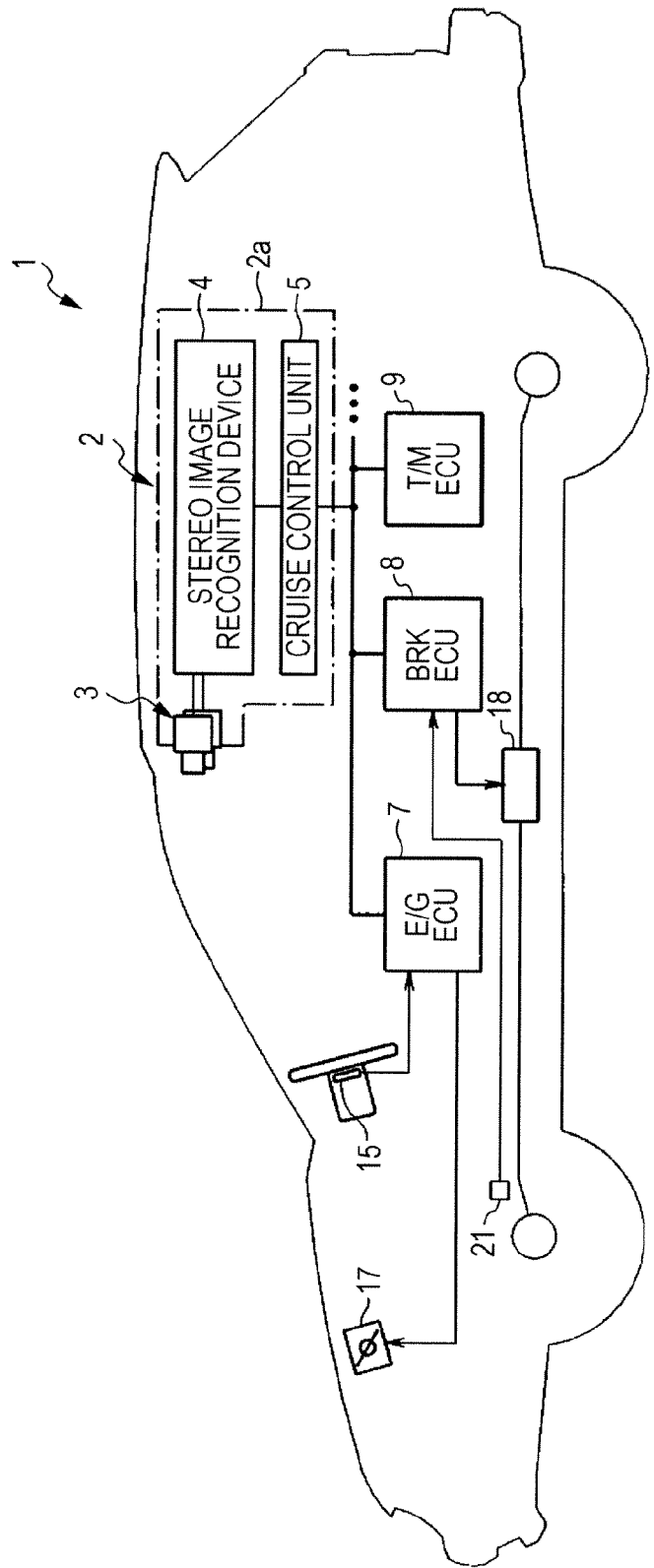
FIG. 1 is a schematic configuration diagram showing a vehicle driving support apparatus installed in a vehicle.
Figure 2:
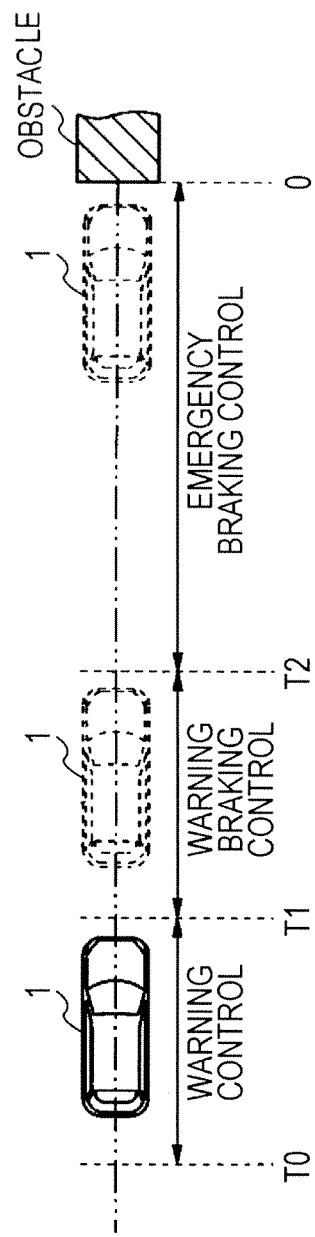
FIG. 2 is an explanatory view showing a timing of controls of a braking control set between a subject vehicle and a obstacle.

An embodiment of the present invention will hereunder be described with reference to the drawings. The drawings relate to an embodiment of the present invention. FIG. 1 is a schematic configuration diagram showing a vehicle driving support apparatus installed in a vehicle; FIG. 2 is an explanatory view showing a timing of controls of a braking control set between a subject vehicle and a obstacle; and FIG. 3 is a flowchart of a collision prevention control routine.

In FIG. 1, reference numeral 1 denotes a vehicle (subject vehicle) such as an automobile. The subject vehicle 1 is equipped with a vehicle driving support apparatus 2 that has cruise control functions including a collision prevention control (pre-crash braking control) and an adaptive cruise control (ACC) with an inter-vehicle distance control.

The vehicle driving support apparatus 2 mainly includes, for example, a stereo camera assembly 2a that is integrally provided with a stereo camera 3, a stereo image recognition device and a cruise control unit 5. The cruise control unit 5 of the stereo camera assembly 2a is connected to onboard control units such as an engine control unit (E/G_ECU) 7, a brake control unit (BRK_ECU) 8, a transmission control unit (T/M_ECU) 9, so as to allow communication therewith.

The stereo camera 3 includes a left and right pair of CCD cameras using solid state imaging devices such as charge-coupled devices (CCDs) for example, as a stereo optical system. The CCD cameras in a pair are attached on front portions of a ceiling in a vehicle compartment with a predetermined space therebetween, capture stereo images of an object outside the vehicle from different viewpoints, and output the captured image information to the stereo image recognition device 4.

The stereo image recognition device 4 receives the image information from the stereo camera 3 as well as a subject vehicle speed V and the like from the T/M_ECU 9, for example. The stereo image recognition device 4 recognizes front information such as three-dimensional object data and white road line data in front of the subject vehicle 1 based on the image information from the stereo camera 3, and estimates a traveling route of the subject vehicle 1 based on the recognized information. Furthermore, the stereo image recognition device 4 detects a preceding vehicle in the traveling route of the subject, based on the recognized three-dimensional object data and the like.

The stereo image recognition device 4 processes the image information from the stereo camera 3 in the following manner, for example. Firstly, distance information is generated for a pair of stereo images captured in the traveling direction of the subject vehicle 1 by the stereo camera 3, using an amount of misalignment between corresponding positions in the images according to the principle of triangulation. Then, the image information is subjected to a known grouping process, and the processed information is compared with three-dimensional road shape data, three-dimensional object data and the like, which are previously stored. As a result of the comparison, white road line data, side wall data on a guardrail and a curb extending along the road, and three-dimensional data on a vehicle and the like are extracted. Furthermore, the stereo image recognition device 4 estimates the traveling route of the subject vehicle 1 based on the white road line data, the side wall data and the like, and extracts (detects), as a preceding vehicle, an object that is present in the traveling route of the subject vehicle 1 and moves at a predetermined speed (for example, 0 km/h or more) in almost a same direction as the direction of the vehicle 1. If a preceding vehicle is detected, the stereo image recognition device 4 calculates preceding vehicle information such as a distance (inter-vehicle distance) D from the preceding vehicle, a preceding vehicle speed Vf=((rate of change in the inter-vehicle distance D)+(the subject vehicle speed V)), and a preceding vehicle acceleration af (a differential value of the preceding vehicle speed Vf). A preceding vehicle that has a speed Vf of a predetermined value or less (for example, 4 km/h or less) and does not accelerate is recognized as a preceding vehicle in a substantially stop state.

The cruise control unit 5 receives recognition information on the outside in front of the subject vehicle 1 from the stereo image recognition device 4, and the subject vehicle speed V from the T/M_ECU 9, for example.

Further, the cruise control unit 5 receives information on settings set by a driver with a cruise control switch 15 via the E/G_ECU 7, for example. In this embodiment, the cruise control switch 15 is an operation switch configured with, for example, a push switch and a toggle switch disposed on a steering wheel. The cruise control switch 15 includes a cruise switch "CRUISE" that is a main switch and turns on/off the operation of the ACC, a cancellation switch "CANECEL" for canceling the ACC, a setting switch "SET/−" for setting a current subject vehicle speed as a set vehicle speed Vset, an inter-vehicle distance setting switch for setting a mode for the inter-vehicle distance between a preceding vehicle and the subject vehicle, a resume switch "RES/+" for resetting a previously-stored set vehicle speed Vset. In this embodiment, the mode for the inter-vehicle distance is set to any one of "long," "medium" and "short." The cruise control unit 5 sets a target following distance Dtrg of a different value for each of the modes, in accordance with, for example, the subject vehicle speed V.

Further, the cruise control unit 5 receives, for example, a brake pedal depression amount θbrk through the BRK_ECU 8. The brake pedal depression amount θbrk is a depression stroke of the brake pedal by a driver and is detected by a brake pedal depression sensor 21. The brake pedal depression sensor 21 may be replaced with a sensor that detects a brake hydraulic pressure.

When the cruise switch of the cruise control switch 15 is turned on, the set vehicle speed Vset is set to a value the driver desires through the set switch or the like, and the mode for setting the target following distance Dtrg is set through the inter-vehicle distance setting switch, the cruise control unit 5 executes the ACC.

When no preceding vehicle is detected by the stereo image recognition device 4, the cruise control unit 5 executes, as the ACC, a constant speed cruise control that matches the subject vehicle speed V to the set vehicle speed Vset. When a preceding vehicle is detected by the stereo image recognition device 4 during the constant speed cruise control, the cruise control unit 5 performs a follow-up cruise control that matches the inter-vehicle distance D to the preceding vehicle to the target following distance Dtrg. The follow-up cruise control also includes a following stop and a following start.

Accordingly, when the constant speed cruise control is started, the cruise control unit 5 calculates a target acceleration a1 for matching the subject vehicle speed V to the set vehicle speed Vset.

Specifically, for example, the cruise control unit 5 calculates a vehicle speed deviation Vsrel between the subject vehicle speed V and the set vehicle speed Vset (=Vset−V) and refers to a preset map so as to calculate the target acceleration a1 corresponding to the vehicle speed deviation Vsrel and the subject vehicle speed V. When, for example, the vehicle speed deviation Vsrel takes a positive value, the target acceleration a1 is set to a larger value within a range having an upper limit corresponding to the subject vehicle V, as the vehicle speed deviation Vsrel becomes larger. When the vehicle speed deviation Vsrel takes a negative value, on the other hand, the target acceleration a1 is set to a smaller value within a range having a lower limit corresponding to the subject vehicle V, as the vehicle speed deviation Vsrel becomes smaller (the target acceleration a1 is set to a larger value as a deceleration as the vehicle speed deviation Vsrel becomes larger on the negative side).

When the cruise control unit 5 shifts from the constant speed control to the follow-up cruise control, the cruise control unit 5 calculates the above-mentioned target acceleration a1, as well as a target acceleration a2 for matching the inter-vehicle distance D to the target following distance Dtrg.

Specifically, for example, a map for setting the target following distances Dtrg so as to the mode "long" or "short" for the inter-vehicle distance is previously set and stored in the cruise control unit 5. When the mode is "long" or "short," the cruise control unit 5 sets the target following distance Dtrg based on the subject vehicle speed V using the corresponding map. When the mode is set to "moderate," the cruise control unit 5 sets the target following distance Dtrg to an intermediate value between the target following distances Dtrg for the "long" mode and the "short" mode. Further, for example, the cruise control unit 5 calculates a distance deviation ΔD between the target following distance Dtrg and the inter-vehicle distance D=(Dtrg−D), and calculates a relative speed Vfrel between the preceding vehicle speed Vf and the subject vehicle speed V=(Vf−V) so as to calculate the target acceleration a2, by referring to a preset map that uses the distance deviation ΔD and the relative speed Vfrel as parameters.

Then the cruise control unit 5 sets the target acceleration a1 as the final target acceleration a in the constant speed cruise control, while the cruise control unit 5 sets the target acceleration a1 or the target acceleration a2, whichever is smaller, as the final target acceleration in the follow-up cruise control.

For a case in which, for example, the subject vehicle 1 enters a curve, is coasting during the constant speed cruise control or the follow-up cruise control, another target acceleration in addition to the above-mentioned target accelerations a1 and a2 may be calculated, and the target acceleration with a minimum among these target accelerations may be set as the final target acceleration a.

After setting the target acceleration a, the cruise control unit 5 controls the opening degree of an electronic throttle control valve 17 through the E/G_ECU 7 (engine output control) so as to generate an acceleration corresponding to the target acceleration a. Furthermore, when it is determined that a sufficient acceleration (deceleration) cannot obtained by the engine output control only, the cruise control unit 5 controls of a hydraulic pressure output from a brake booster 18 through the BRK_ECU (automatic brake intervention control).

When the follow-up cruise control stops the subject vehicle 1 following a preceding vehicle, the cruise control unit 5 maintains the stop state by, for example, operating an electric parking brake, which is not shown. The cruise control unit 5 releases the brake and restarts the ACC on condition that the driver operates an accelerator pedal, or operates the cruise switch of the cruise control switch 15, for example.

Next, the collision prevention control will be described. In the collision prevention control, when there are three-dimensional objects recognized by the stereo image recognition device 4 in the traveling route of the subject vehicle, the cruise control unit 5 recognizes an object closest the subject vehicle as a obstacle. Examples of the obstacle includes the aforementioned preceding vehicle recognized by the stereo image recognition device 4 as well as a three-dimensional object that is at a stop in the traveling route of the subject vehicle. When the obstacle is recognized, the cruise control unit 5 calculates a time to collision TTC based on, for example, a relative distance and relative speed between the subject vehicle 1 and the obstacle. The TTC is an expected time or time allowance that will elapse until the subject vehicle 1 collides with the obstacle, and is obtained by dividing the relative distance to the obstacle by the relative speed thereto. When it is determined based on the TTC that there is a possibility of a collision against the obstacle, the cruise control unit 5 executes a braking control.

In the embodiment, the braking control is a control in a broad sense that relates to braking of the subject vehicle 1. Specifically, the braking control includes three steps of a warning control, a warning braking control and an emergency braking control.

The warning control is firstly executed when the cruise control unit 5 determines that there is a possibility of a collision against the obstacle. The warning control is executed when the TTC becomes shorter than or equal to a predetermined threshold T0 (for example, T0=2 seconds) as shown in FIG. 2. The warning control calls attention of a driver to the obstacle by, for example, outputting a warning sound or displaying a warning on a meter, so as to prompt the driver to perform a collision prevention operation such as a brake operation.

The warning braking control is executed when the driver does not perform a proper collision prevention operation such as steering or braking operation in response to the warning control. The warning braking control is executed when the TTC becomes shorter than or equal to a predetermined threshold T1 (for example, T1=1.5 seconds) as shown in FIG. 2. The warning braking control performs a mild automatic braking intervention (for, example, automatic braking intervention using a braking force of 0.3 G or less) by, for example, controlling an output hydraulic pressure from a brake booster 18 through the BRK_ECU8, so as to alert the driver again.

The emergency braking control is executed when the driver still does not perform a proper collision prevention operation in response to the warning braking control. The emergency braking control is executed when the TTC becomes shorter than or equal to a predetermined threshold T2 (for example, T2=1 second) as shown in FIG. 2. The emergency braking control performs a strong automatic braking intervention (for, example, automatic braking intervention using a braking force of 0.5 G or less) by, for example, controlling the output hydraulic pressure from the brake booster 18 through the BRK_ECU8, so as to stop the subject vehicle 1 immediately in front of the obstacle.

When the subject vehicle 1 is stopped by the automatic braking intervention, the cruise control unit 5 maintains the subject vehicle 1 in the stationary state by, for example, activating an unillustrated electronic parking brake.

Meanwhile, if the cruise control unit 5 detects a depression of the brake pedal based on a signal from the brake pedal depression sensor 21 or the like, the cruise control unit 5 gives priority to the driver's collision prevention operation and determines a halt of the braking control. However, even after the halt of the braking control is determined, the cruise control unit 5 determines the restart of the halted braking control if the brake pedal depression amount θbrk changes to a release side at or over a preset speed ω0.

While the collision prevention control described above can be executed independently, it can also be used in combination with the ACC. In this case, when the execution of the braking control is determined in the collision prevention control, the braking control is basically given priority to the ACC.

In this manner, the cruise control unit 5 of the present embodiment implements functions of a collision determining unit, a braking control unit, a control halt determining unit and a control restart determining unit of the present invention.

Next, the collision prevention control executed by the cruise control unit 5 will be described with reference to the flowchart of a collision prevention control routine shown in FIG. 3.

The routine is executed every predetermined time. When the routine starts, in step S101 the cruise control unit 5 firstly examines whether or not the TTC is shorter than or equal to the threshold T0 (for example, T0=2 seconds).

If it is determined in step S101 that the TTC is longer than the threshold T0, the cruise control unit 5 determines that the possibility of a collision of the subject vehicle and the obstacle is low, and exits the routine without any change.

If it is determined in step S101 that the TTC is shorter than or equal to the threshold T0, the cruise control unit 5 determines that there is a possibility that the subject vehicle 1 can collide with the obstacle, and thus that it is necessary to execute the braking control. Then the cruise control unit 5 proceeds to step S102.

When the cruise control unit 5 proceeds to step S102 from step S101, the cruise control unit 5 determines whether or not the driver has depressed the brake pedal, based on the brake pedal depression amount θbrk detected by the brake pedal depression sensor 21.

If it is determined in step S102 that the driver has not depressed the brake pedal, the cruise control unit 5 proceeds to step S104.

If it is determined in step S102 that the driver has depressed the brake pedal, the cruise control unit 5 proceeds to step S103 to set a flag Fb to "1", the flag Fb indicating the halt of the braking control is determined due to the brake operation by the driver. Then the cruise control unit 5 proceeds to step S104.

When the cruise control unit 5 proceeds to step S104 from step S102 or step S103, the cruise control unit 5 examines whether or not the flag Fb is set to "1". If the flag Fb is set to "0", the cruise control unit 5 proceeds to step S107.

If it is determined in step S104 that the flag Fb is set to "1", the cruise control unit 5 proceeds to step S105 to examine whether or not the brake pedal depressed by the driver is shifted to the release side at or over the preset speed ω0. The preset speed (A is set to a predetermined value within, for example, a speed (angular speed) that the brake pedal can form when it is swung to the release side only with an urging force generated by a return spring. In other words, the preset speed ω0 is set to a speed that is unlikely to be generated when the driver operates the brake pedal to the release side with the driver's foot being on the brake pedal.

If it is determined in step S105 that the brake pedal is not shifted to the release side at or over the preset speed ω0, the cruise control unit 5 determines that it is highly likely that the driver is still depressing the brake pedal or that it is highly likely that the driver shifted the brake to the release side at the will of the driver. Then the cruise control unit 5 exits the routine, maintaining fb=1.

If it is determined in step S105 that the brake pedal is shifted to the release side at or over the preset speed ω0, the cruise control unit 5 determines that there is a possibility that the driver's foot has accidentally slipped off the brake pedal or the like. Then the cruise control unit 5 proceeds to step S106 to reset the flag Fb to "0", then to step S107.

When the cruise control unit 5 proceeds to step S107 from step S104 or step S106, the cruise control unit 5 examines whether or not the TCC is shorter than or equal to the threshold T1 (for example, T1=1.5 seconds).

If it is determined in step S107 that the TTC is longer than the T1 (that is, T1<TTC≤T0), the cruise control unit 5 proceeds to step S108 to prompt the driver to operate the brake or the like by outputting a warning sound from an unillustrated buzzer, displaying a warning on a meter on an instrument panel or the like. Then the cruise control unit 5 exits the routine.

If it is determined in step S107 that the TTC is shorter than or equal to the T1, on the other hand, the cruise control unit 5 proceeds to step S109 to examine whether or not the TTC is shorter than or equal to the threshold T2 (for example, T2=1 second).

If it is determined in step S109 that the TTC is longer than the threshold T2 (that is, T2<TTC≥T1), the cruise control unit 5 proceeds to step S110 to perform the braking control, which also serves as a warning to the driver, by the mild automatic braking intervention. Then the cruise control unit 5 exits the routine.

If it is determined in step S109 that the TTC is shorter than or equal to the threshold T2, the cruise control unit 5 performs the braking control through the strong automatic braking intervention in order to stop the subject vehicle 1 immediately in front of the obstacle. Then the cruise control unit 5 exits the routine.

According to the present embodiment, if the brake pedal operation by the driver is detected during the braking control, it is determined that it is highly likely that the driver recognizes the possibility of a collision of the subject vehicle 1 and a obstacle, and then the braking control is halted. As a result, it is possible to prevent an unnecessary intervention of the braking control against the will of the driver. On the other hand, if the depression amount of the brake pedal by the driver changes to the release side at or over a preset speed under the condition where there is a high possibility of a collision against a preceding vehicle or the like, the halted braking control is restarted, whereby the collision prevention control can be effectively performed.

Thus, in the case, for example, where the driver, who has noticed with the warning control that there is a high possibility of a collision against obstacle such as a preceding vehicle, makes haste to perform a brake operation, and immediately afterwards the driver' foot slips off the brake pedal so that the brake is released, the halted braking control can be effectively restarted with respect to the obstacle. In this manner, a collision due to an operational error of the driver can be prevented or reduced.

In the present embodiment, if, for example, the braking control is halted when the TTC is exceedingly short, it may be impossible to restart the braking control with respect to the obstacle appropriately in time. Thus, the halt of the braking control may be permitted only at a timing when the TTC is not shorter than or equal to a preset time. Specifically, for example, the halt of the braking control in response to the driver's brake operation is permitted only when the TCC is longer than the threshold T2. At timing where the TTC is shorter or equal to the threshold T2, the halt of the braking control is prohibited even if a brake operation is detected, and the emergency control is subsequently performed.

The present invention is not limited to the above-described embodiments, and permits various modifications and alterations within the technical scope of the invention. For, example, the braking control is not limited to the above-described form. Furthermore, the above-embodiments perform the collision prevention braking control based on the TCC, but the present invention is not limited to this. Alternatively, for example, the collision prevention braking control may be performed by directly using the relative distance to the obstacle or the like as a parameter.

What is claimed is:

1. A vehicle driving support apparatus, comprising:
   a collision determining unit for determining a possibility of a collision of a subject vehicle and a obstacle that is recognized in a front of the subject vehicle;
   a braking control unit for performing a braking control with respect to the obstacle when the collision determining units determines that there is the possibility of the collision of the subject vehicle and the obstacle;
   a control halt determining unit that determines a halt of the braking control when a brake pedal operation by a driver is detected; and
   a control restart determining unit that determines a restart of the halted braking control when a brake pedal depressed by the driver is shifted to a release side and when a speed of the brake pedal is over a preset pedal speed while it is determined there is the possibility of the collision against the obstacle.

2. The vehicle driving support apparatus according to claim 1, wherein the preset pedal speed is set to a high speed that is unlikely to be generated when the driver operates the brake pedal to the release side with the driver's foot being put on the brake pedal.

3. The vehicle driving support apparatus according to claim 2, wherein the brake pedal swings to the release side by an urging force.

4. The vehicle driving support apparatus according to claim 1, wherein the collision determining unit comprises:
   a time to collision calculating unit for calculating a time to the collision of the subject vehicle and the obstacle; and a warning executing unit for warning the driver when the time to the collision becomes shorter than or equal to a predetermined threshold.

5. The vehicle driving support apparatus according to claim 1, wherein the collision determining unit comprises a time to collision calculating unit for calculating a time to the collision of the subject vehicle and the obstacle, and
wherein the braking control unit performs the braking control so as to alert the driver when the time to the collision becomes shorter than or equal to a predetermined threshold.

6. The vehicle driving support apparatus according to claim 1, wherein the collision determining unit comprises a time to collision calculating unit for calculating a time to the collision of the subject vehicle and the obstacle, and
wherein the braking control unit performs the braking control so as to stop the subject vehicle when the time to the collision becomes shorter than or equal to a predetermined threshold.

7. The vehicle driving support apparatus according to claim 1, wherein the collision determining unit comprises a time to collision calculating unit for calculating a time to the collision of the subject vehicle and the obstacle, and
wherein the braking control unit permits the halt of the braking control determined by the control halt determining unit only when the time to the collision is longer than a predetermined threshold.

8. The vehicle driving support apparatus according to claim 1, wherein the collision determining unit comprises a time to collision calculating unit for calculating a time to the collision of the subject vehicle and the obstacle, and
wherein the braking control unit prohibits the halt of the braking control determined by the control halt determining unit when the time to the collision is shorter than or equal to a predetermined threshold.

9. The vehicle driving support apparatus according to claim 1, further comprising:
a brake pedal depression sensor for detecting a depression stroke of the brake pedal by the driver as a depression amount of the brake pedal.

10. The vehicle driving support apparatus according to claim 1, wherein the braking control unit starts to work again after the braking control unit is halted by the brake pedal operation of the driver.

11. The vehicle driving support apparatus according to claim 1, wherein the control restart determining unit restarts the braking control unit according to a depressing amount of the brake pedal by the driver after halting the braking control.

12. The vehicle driving support apparatus according to claim 1, wherein the preset pedal speed is set to a predetermined value within a speed that the brake pedal forms when the brake pedal is swung to the release side only with an urging force.

13. The vehicle driving support apparatus according to claim 1, wherein the preset pedal speed is set to a speed that is not generated when the driver operates the brake pedal to the release side with the driver's foot being put on the brake pedal.

14. The vehicle driving support apparatus according to claim 1, wherein, when the brake pedal depressed by the driver is shifted to the release side and when the speed of the brake pedal is over the preset pedal speed, the control restart determining unit determines that there is a possibility that the driver's foot has accidentally slipped off the brake pedal.

15. The vehicle driving support apparatus according to claim 1, wherein, when the driver is noticed with a warning control that there is the possibility of the collision and the driver performs the brake pedal operation, and afterwards the driver' foot slips off the brake pedal so that the brake is released, the halted braking control is restarted with respect to the obstacle.

16. The vehicle driving support apparatus according to claim 1, wherein the braking control unit restarts the halting braking control according to a movement of the brake pedal, after the halted braking control.

17. The vehicle driving support apparatus according to claim 1, wherein the braking control unit is halted while an intention of the driver to decelerate is given priority, and after the braking control unit is halted, the braking control unit restarts, irrespective of the intention of the driver, depending on a movement of the brake pedal.

* * * * *